(12) United States Patent
Ayambem et al.

(10) Patent No.: US 9,115,027 B2
(45) Date of Patent: Aug. 25, 2015

(54) LOW DUST JOINT COMPOUND AND METHOD OF MAKING THE SAME

(75) Inventors: Amba Ayambem, Monroe, NC (US); John T. Ferretti, Matthews, NC (US)

(73) Assignee: National Gypsum Properties, LLC, Charlotte, NC (US)

( * ) Notice: Subject to any disclaimer, the term of this patent is extended or adjusted under 35 U.S.C. 154(b) by 0 days.

(21) Appl. No.: 12/880,904

(22) Filed: Sep. 13, 2010

(65) Prior Publication Data

US 2011/0065839 A1    Mar. 17, 2011

Related U.S. Application Data

(60) Provisional application No. 61/241,682, filed on Sep. 11, 2009.

(51) Int. Cl.
| | | |
|---|---|---|
| *C04B 16/02* | (2006.01) |
| *C04B 26/04* | (2006.01) |
| *C04B 28/14* | (2006.01) |
| *C04B 26/06* | (2006.01) |
| *C09D 109/06* | (2006.01) |
| *C04B 103/00* | (2006.01) |
| *C04B 111/00* | (2006.01) |

(52) U.S. Cl.
CPC ............ *C04B 26/06* (2013.01); *C04B 26/04* (2013.01); *C09D 109/06* (2013.01); *C04B 2103/0065* (2013.01); *C04B 2111/00482* (2013.01); *C04B 2111/00672* (2013.01); *C04B 2111/00681* (2013.01)

(58) Field of Classification Search
USPC .................................. 524/501, 503
See application file for complete search history.

(56) References Cited

U.S. PATENT DOCUMENTS

| | | | |
|---|---|---|---|
| 4,454,267 A | 6/1984 | Williams | |
| 4,661,161 A | 4/1987 | Jakacki et al. | |
| 4,782,632 A | 11/1988 | Matechuk | |
| 4,955,748 A | 9/1990 | Krumholz | |
| 5,039,341 A | 8/1991 | Meyer | |
| 5,336,318 A | 8/1994 | Attard et al. | |
| 5,512,616 A | 4/1996 | Podlas | |
| 5,653,797 A | 8/1997 | Patel | |
| 6,358,309 B1 * | 3/2002 | Langford | 106/661 |
| 6,406,779 B1 | 6/2002 | Carbo et al. | |
| 6,673,144 B2 | 1/2004 | Immordino, Jr. et al. | |
| 6,712,897 B2 | 3/2004 | Ayambem et al. | |
| 2004/0077782 A1 | 4/2004 | Heldmann et al. | |
| 2004/0097645 A1 | 5/2004 | Weitzel et al. | |
| 2005/0014883 A1 | 1/2005 | Blankenship et al. | |
| 2006/0048684 A1 | 3/2006 | Bonetto et al. | |
| 2006/0249705 A1 | 11/2006 | Wang et al. | |
| 2008/0132624 A1 | 6/2008 | Killat et al. | |
| 2008/0216715 A1 | 9/2008 | Langford | |
| 2008/0308968 A1 | 12/2008 | Immordino | |
| 2009/0192242 A1 * | 7/2009 | Willimann et al. | 524/5 |

FOREIGN PATENT DOCUMENTS

| | | | | |
|---|---|---|---|---|
| DE | 102005012986 A1 | 9/2006 | | |
| EP | 0 728 779 A2 * | 8/1996 | ............ C08F 285/00 |
| EP | 0728779 A2 | 8/1996 | | |
| JP | 6-287544 A | 10/1994 | | |
| WO | 2009009216 A1 | 1/2009 | | |
| WO | WO 2009/009216 * | 1/2009 | ............ C08L 33/00 |

OTHER PUBLICATIONS

PCT/US2010/048657 International Searching Authority, International Search Report, Oct. 14, 2010.
PCT/US2010/048657 International Searching Authority, Written Opinion of the International Searching Authority, Oct. 14, 2010.

* cited by examiner

*Primary Examiner* — Robert Harlan

(57) ABSTRACT

A joint compound or wall repair composition and the method of making the same is disclosed that reduces the amount of airborne dust emitted during traditional sanding processes. Generally, such a reduction can be achieved by combining a first binder that has a high glass transition temperature and a second binder that has a low glass transition temperature with conventional joint compound compositions.

13 Claims, No Drawings

LOW DUST JOINT COMPOUND AND METHOD OF MAKING THE SAME

RELATED APPLICATION

This U.S. Utility Patent Application claims priority to U.S. Provisional Patent Application 61/241,682, which was filed on Sep. 11, 2009.

FIELD OF INVENTION

This disclosure generally relates to joint compound compositions, wallboard repair compound compositions, spackling compositions, wood fillers, plasters, and the like used to repair imperfections in walls or fill joints between adjacent wallboard panels. More particularly, this disclosure relates to such compositions that reduce the quantity of airborne dust generated when the hardened composition is sanded.

BACKGROUND OF INVENTION

Interior walls of commercial and residential buildings are often constructed using gypsum wallboard panels, generally referred to as "wallboard" or "drywall". During construction of the walls, wallboard panels are affixed adjacent to one another on a support structure (e.g., a wooden frame) using screws, nails or other fasteners. As the wall is constructed, gaps (typically referred to as "joints") are formed between the adjacent wallboard panels. In order to achieve a smooth, visually appealing surface, the joints between the board panels and any cracks, screw holes, and/or nail holes must be concealed.

A formulated adhesive composition, typically known as a "joint compound composition" or "wall repair compound", is commonly used to conceal and finish the joints and any other imperfections in the wall (e.g., cracks, screw holes, or nail holes). The procedure for concealing the joints involves applying soft wet joint compound within the joints formed by the abutting edges of adjacent wallboard panels using a trowel or other straight edged tool. A fiberglass, cloth, or paper reinforcing tape material is then embedded within the wet joint compound, and the joint compound is allowed to harden.

After the compound composition has hardened, a second layer of compound composition is applied over the joint and tape to completely fill the joint and provide a smooth surface. Multiple layers may be applied in order to obtain a smooth, attractive finished wall. Each layer is allowed to dry prior to application of the next layer. Upon hardening, the compound composition is sanded smooth to eliminate surface irregularities. Paint or a wall covering, such as wall paper, can then be applied over the joint compound composition and wallboard panels, so that the compound composition and the panels are imperceptible under the paint or wall covering. While such compound compositions are referred to as joint compound compositions throughout this disclosure, it will be appreciated that the terms "wall repair composition", "joint compound composition", "compound composition" or "joint compound" are not limiting in nature and refer generally to any composition, including, but not limited to, wallboard repair compound compositions, spackling compositions, wood fillers, and plasters, that can be used to finish the joints and/or conceal the joints in between wallboard panels or be used to conceal or repair any imperfections in a wall.

An array of joint compound compositions have been sold commercially, described in printed publications, and have been the subject of patents. Generally, such compound compositions are referred to as either "ready mixed" compounds or "setting type" compounds and are made up of a filler (e.g., calcium carbonate, calcium sulfate hemihydrate, or calcium sulfate dihydrate), thickener, preservative, and a binder, as well as various other additives. A common example of such a joint compound is disclosed in U.S. Pat. No. 5,653,797, which is incorporated herein by reference.

"Ready mixed" or "drying type" compositions, are pre-mixed with water during manufacturing and require little or no addition of water at the job site. Such compounds harden when the water evaporates and the compound dries. Ready mixed compounds substantially contain a filler component that can be either calcium carbonate ($CaCO_3$; also referred to as limestone), calcium sulfate dihydrate ($CaSO_4 \cdot 2H_2O$) and/or talc ($Mg_3Si_4O_{10}(OH)_2$ or $3MgO_4SiO_2H_2O$). Prior to use (generally during manufacturing), the filler, a binder and several other ingredients are mixed for a specific time with water to produce the ready mixed compound composition. Such a composition has a high ionic content and basic pH. Once the ready mixed compound composition is applied to the wallboard panels, the composition dries (i.e., water evaporates) and a dry, relatively hard cementitious material remains. Many conventional ready mix compound compositions undergo shrinkage upon drying, which makes it difficult to achieve a smooth wall surface. Shrinkage can be particularly troublesome when a second coat of compound is applied over a previous coat that is not completely dried.

To avoid such disadvantages of the ready mix compound compositions, "setting type" compound compositions have been developed. A setting type compound composition generally includes calcium sulfate hemihydrate ($CaSO_4 \cdot \frac{1}{2}H_2O$; also referred to as calcined gypsum) as its filler and hardens upon being mixed with water. Upon being mixed with water, the calcium sulfate hemihydrate is hydrated, which causes dihydrate crystals to form and interlock.

To produce calcined gypsum, calcium sulfate dihydrate is converted from raw gypsum to the hemihydrate state via a suitable calcination process. A gypsum calcination process removes one and one-half molecules of water from each calcium sulfate dihydrate gypsum molecule. The hemihydrate form of calcium sulfate is substantially more soluble in water than the dihydrate form of calcium sulfate. During use of a setting type compound composition, the calcium sulfate hemihydrate is rehydrated to the dihydrate state via the addition of water. This rehydration process normally takes place over a fairly short period of time. Once completed, a dry, relatively hard cementitious material remains. It has been extremely difficult to produce a setting type compound composition comprising hemihydrate gypsum pre-mixed with water, because such a pre-mixed product would set in its storage container. For this reason, setting type compound compositions are typically supplied to the job site in the form of a dry powder to which the user then adds a sufficient amount of water to give the compound a suitable consistency to be applied to the wall.

Setting type compounds have the advantage of having generally quicker finishing times (setting time) than ready mix compounds. This is advantageous because it prevents the shrinkage problems associated with ready mix compounds. Further, because setting type compounds form a crystalline network upon setting (as opposed to merely drying), these compounds typically provide a stronger, more durable bond between adjacent wallboard sheets than the bond formed by ready mix compounds. However, because these compounds provide a strong crystalline network upon setting, the setting type compound is often harder to sand to a smooth finish.

Ready mixed, setting type joint compounds are also known. For example, U.S. Pat. No. 4,661,161 suggests a joint compound comprising an aqueous slurry of calcium sulfate hemihydrate and a set retarding agent formed of two ingredients: an organic, proteinaceous retarder and a chelating agent (e.g., selected from diethylene triamine pentaacetic acid, ethylene diamine tetraacetic acid, and salts thereof). This patent indicates that the compound has an adequately long shelf life for commercialization, and that when mixed with an accelerator that the joint compound hydrates after a period of time to form a set material having acceptable joint compound properties. However, it is believed that joint compounds of the setting, ready mix type have not been successfully commercially employed due to the difficulty in finding a suitable retarding agent and a suitable accelerator to overcome the retarding agent.

Regardless of the type of joint compound used, a user will, after the compound hardens, sand the compound to create a smooth finish before painting or applying a wall covering to the wall. Sanding hardened joint compound can be accomplished using conventional techniques including power sanders, abrasive screens, or manual sanders. During the sanding process, a portion of the joint compound is sanded away. Unfortunately, a large portion of the removed joint compound typically is in the form of a fine powder and/or dust that tends to become suspended in air for a long period of time. Eventually, this joint compound dust settles on everything in the vicinity of the sanding site. A lengthy and tedious clean up process must then take place to remove the dust from the site. Due to the dust settling over time, multiple cleanings must occur to remove all of the joint compound. Not only is this a time consuming process but the dust could present a health hazard to workers. Studies have shown that dust levels at the job site normally exceed the limits set by the Occupational Safety and Health Agency ("OSHA") and even when the dust levels fall below the limitations set by OSHA, it is not known whether the dust still poses a health risk.

To limit exposure and avoid potential health complications, an exhaust ventilation system, personal protective equipment (e.g., masks), or "low dust" removal techniques can be used. For example, U.S. Pat. No. 4,782,632 discloses a sander with a sanding head designed to reduce the dust created and discloses attaching a vacuum to the sander to immediately capture the dust. U.S. Pat. No. 4,955,748 discloses a drywall finishing system that utilizes a wet sponge to prevent the formation of dust. While these methods are available, it is still preferred to use conventional sanding techniques because they are less expensive and perceived to be easier. Thus, it would be preferred if dust could be reduced through the formulation of the joint compound composition, so conventional sanding techniques could be used.

To address this need, manufacturers are beginning to offer "low-dust" joint compound compositions that reduce the amount of dust that is created when conventional sanding techniques are used. For example, U.S. Pat. No. 6,358,309 discloses a joint compound that is mixed with an additive that produces a lower amount of dust during the sanding process than the joint compound does without such an additive. As discussed in the patent, such additives can be used with either ready mix or setting type joint compounds and suitable additives include oils (such as mineral oils, vegetable oils and animal oils), surfactants, oleoresinous mixtures, pitch, solvents, paraffins, waxes, including natural and synthetic wax, glycols, and other petroleum derivatives. It is theorized in U.S. Pat. No. 6,358,309 that such additives cause the dust particles to agglomerate or stick together, thereby forming larger and heavier particles which tend not to become or remain airborne.

While the inclusion of such dust reducing additives do decrease the amount of dust produced during conventional sanding processes, it has been observed that such additives lead to other problems during the wall finishing process. For example, when users sand a hardened joint compound containing such oil or wax additives, the joint compound sticks to the sand paper causing the sand paper to quickly become clogged and unusable. As a result, users of joint compound with such additives are required to change to new sand paper more frequently during the sanding process and as a result, use more sand paper than required with conventional joint compounds.

Moreover, it has also been suggested by users that such additives cause an increase in "flashing" problems when a finished wall is painted. The term "flashing" refers to when the joints and/or other areas covered by the joint compound can still be seen when the wall is painted. Here, joint compounds with the oil or wax additives disclosed in U.S. Pat. No. 6,358,309 have different absorption characteristics than the wallboard panels. When the walls using such low dust joint compound compositions are painted, the areas that correspond to the joints are likely to be more severely discolored than walls using conventional joint compound compositions because of the difference absorption characteristics between the board and joint compound. As a result, such joints may be noticed once the wall is painted, which causes dissatisfaction with the appearance of the painted wall.

Thus, a joint compound composition is still needed that reduces the amount of dust produced during conventional sanding processes that has the same general characteristics of conventional joint compound compositions. For example, it is desirable to obtain a low dust joint compound that sands easily without increased clogging problems during sanding of the hardened joint compound and allows for the joints to have similar absorption characteristics as the wallboard panels, so that the joints are not easily noticed when the wall is painted.

SUMMARY

As discussed herein, a joint compound composition and method of making the same is disclosed that reduces the amount of airborne dust that is emitted during the sanding of the hardened joint compound composition. Such a joint compound composition comprises a filler material and at least a first binder and a second binder. The first binder has a glass transition temperature that is equal to or greater than about −10 degrees Celsius and the second binder has a glass transition temperature between the range of about −80 degrees Celsius to about 10 degrees Celsius. It is preferred that the first binder has a glass transition temperature between the range of about 0 degrees Celsius to about 40 degrees Celsius. The first binder and second binders are selected so that the glass transition temperature of the first binder is at least about 5 degrees Celsius greater than the glass transition temperature of the second binder.

Such a joint compound composition typically has a filler material that comprises between about 25% to about 95% of the total wet weight of the joint compound composition, a first binder that is equal to or greater than about 0.5% of the total wet weight of the joint compound composition, and a second binder that is equal to or greater than at least about 0.05% of the total wet weight of the joint compound composition. The first binder and second binder can be added to any conventional joint compound composition, including ready mix joint compounds, setting type joint compounds, and ready mix, setting type joint compounds. Thus, the filler material can include at least one material selected from the group consisting of calcium carbonate, calcium sulfate dihydrate, talc, and calcium sulfate hemihydrate.

The first binder and second binder can be any number of latex or non-latex polymers. For example, the first binder and second binder can be selected from a group consisting of polymers of ethylene vinyl acetate, vinyl acetate, acrylics, styrene acrylics, polyvinyl alcohol, and cellulose ether. In a preferred embodiment, the first binder comprises a functionalized styrene-butadiene polymer and the second binder comprises an emulsion comprising water, a latex polymer (e.g., ethylene-vinyl-acetate), and a plasticizer, wherein the plasticizer depresses the glass transition temperature of the latex polymer. In another embodiment, the first and second binders comprise the same molecule with differing glass transition temperatures.

Such a joint compound composition can be made by adding a first binder having a glass transition temperature that exceeds about −10 degrees Celsius and adding second binder having a glass transition temperature between the range of about −80 degrees Celsius to 10 degrees Celsius to a joint compound composition comprising at least one filler material. The first binder and second binders are selected so that the glass transition temperature of the first binder is at least about 5 degrees Celsius greater than the glass transition temperature of the second binder. One or both of the first and second binders can be added to the joint compound composition during mixing or one or both of the first and second binders can be added after the joint compound composition has been made.

DETAILED DESCRIPTION

Research was undertaken to discover binders that could be added to any type of joint compound composition (ready mix joint compounds, setting type compounds, or ready mix, setting type compounds) to significantly reduce the amount of dust produced during conventional sanding processes without detrimentally impacting the other desired characteristics of the joint compound composition. Generally, such a reduction can be achieved by combining a first binder that has a high glass transition temperature (a "high Tg binder") and a second binder that has a low glass transition temperature (a "low Tg binder") with traditional joint compound ingredients. As generally known in the art, the glass transition temperature ("Tg") marks the temperature that the polymer transitions from a glassy state to a viscoelastic state.

The use of a high Tg binder and low Tg binder can be used with any joint compound composition, including ready mix joint compound compositions, setting type joint compound compositions, or ready mix, setting type joint compound compositions. Conventional joint compound compositions include at least a filler and a binder. Any conventional filler material can be used, including calcium carbonate, calcium sulfate dihydrate, and/or talc for ready mixed joint compound compositions and calcium sulfate hemihydrate for setting type joint compound compositions. Generally, the concentration of the filler is between about 25 weight percent to about 95 weight percent based on the total wet weight (i.e., including water) of the compound composition.

In addition to the filler and binder, conventional joint compound compositions contain any number of other ingredients, such as, thickeners, non-leveling agents, surfactants, stabilizers, preservatives, fungicides, anti-freeze agents, wetting agents, and colorings. Secondary fillers can also be added, including, but not limited to, glass micro bubbles, mica, perlite, limestone, pyrophyllite, silica, and diatomaceous earth. The glass micro bubbles or a treated expanded perlite are added to the compound composition to provide a lighter weight joint compound, as described in U.S. Pat. No. 4,454,267. The selection and concentration of the various components can be any concentration that will afford a joint compound suitable characteristics for home and industrial use. Such characteristics, typically, include having good plasticity, water retention, cohesiveness, viscosity stability, resistance to cracking, sandability, minimal shrinkage, good paint adherence, good hardening properties, low weight and low cost.

While any number of binders can be used in conventional joint compound compositions, it has been found that the combination of a high Tg binder with a low Tg binder reduces the amount of the airborne dust that results from the sanding processes without detrimentally impacting the desired characteristics of the joint compound composition. The high Tg binder and low Tg binder can be added to the joint compound composition during the mixing of the joint compound composition. Alternatively, either the high Tg binder or low Tg binder can be added to the joint compound composition during the mixing of the joint compound composition and the other binder can be added at a later time after the joint compound composition is made and before application of the joint compound. Further, the joint compound composition can be mixed without either of the high Tg binder or low Tg binder and both the high Tg and low Tg binders can be added at a later time after the joint compound composition is made. For example, for a setting type compound, either one or both of the high Tg binder and low Tg binder could be added when the user mixes the setting type joint compound powder with water at the job site. Further, the low Tg binder could be applied as a coating after the joint compound composition is applied to the wall and prior to sanding taking place.

Generally, the glass transition temperature of the low Tg binder can be anything in the range of about −80 degrees Celsius to 10 degrees Celsius. Specific examples of the glass transition temperature of the low Tg binder include about 10 degrees Celsius, 0 degrees Celsius, about −40 degrees Celsius, about −80 degrees Celsius, and ranges between any two of these values. Such a low Tg binder can be used in any type of joint compound composition that also comprises another binder that provides the required bond strength to wallboard panels and/or joint tape for the joint compound composition.

Generally, the glass transition temperature of the high Tg binder can be equal to or anything above −10 degrees Celsius. It is presently preferred that the high Tg binder have a glass transition temperature above about 0 degrees Celsius. It is presently more preferred that the high Tg binder have a glass transition temperature that falls within the range of about 0 degrees Celsius to about 40 degrees Celsius. Specific examples of the glass transition temperature of the high Tg binder include about −10 degrees Celsius, about 0 degrees Celsius, about 5 degrees Celsius, about 40 degrees Celsius, and ranges between any two of these values. While there is some overlap between the disclosed glass transition temperatures for the low and high Tg binders, the high Tg binder and low Tg binder are selected such that the glass transition temperature of the high Tg binder exceeds the glass transition temperature of the low Tg binder by at least 5 degrees Celsius.

Any number of binders can be used as the high Tg binder, including, but not limited to, polymers of ethylene vinyl acetate, vinyl acetate, acrylics, styrene acrylics, and polyvinyl alcohol amongst a wide variety of others. It will also be appreciated that non-latex binders, such as, cellulose ethers, can also be used as the high Tg binder. An example of a latex, high Tg binder that can be used is a functionalized styrene-butadiene polymer, such as Rhoximat PSB 150 (commercially available from Hexion Chemical Company), that has a Tg of about 5 degrees Celsius.

Any number of polymeric binders can be used as the low Tg binder, including, but not limited to, polymers of ethylene vinyl acetate, vinyl acetate, acrylics, styrene acrylics, and polyvinyl alcohol amongst a wide variety of others. An example of a low Tg binder that can be used is an ethylene-vinyl-acetate polymer with a Tg of about −40 degrees Celsius. Such a low Tg binder was created by depressing the Tg of Forbo Chemical Company's commercially available Elvace CPS 716 latex with a plasticizer (e.g., a diethylene or dipropylene dibenzoate ester plasticizer).

A preferred low Tg binder with a Tg of −40 degrees Celsius can be created by adding water at a concentration of at least about 20.7 weight percent based on the weight of the composition, the Elvace CPS 716 latex at a concentration of 47.6 weight percent based on the weight of the composition, and K-Flex 500 (a plasticizer commercially available from Emerald Kalama Chemicals, LLC) at a concentration of 31.7 weight percent based on the weight of the composition. Forbo Chemical Company currently makes such a low Tg binder available under the product name Elvace EP 1026. Another preferred low Tg binder with a Tg of −40 degrees Celsius can be created by adding water at a concentration of at least about 40.1 weight percent based on the weight of the composition, Elvace CPS 741 latex with a Tg of −10 degrees Celsius at a concentration of 53.6 weight percent based on the weight of the composition, and K-Flex 500 plasticizer at a concentration of 5.4 weight percent based on the weight of the composition. Forbo Chemical Company currently makes such a low Tg binder available under the product name Elvace EP 1028.

While examples of low and high Tg binders are disclosed, it will be appreciated by one of ordinary skill in the art that any number of binders can be used as the high Tg binder and/or low Tg binder. Moreover, it should be noted that the high and low Tg binders do not necessarily have to be of different chemistries. In some embodiments, the high and low Tg binders can be the same molecules with different Tgs. In such embodiments, a plasticizer may be used to depress the Tg of one of the molecules to create the low Tg binder. One of ordinary skill in the art will also appreciate that the low Tg binder does not have to be created by using a plasticizer. With respect to either random and/or block copolymers for instance, a low or high Tg can be created by manipulating monomer ratios, even though the general chemistry in terms of functional groups of the copolymers are the same. Consequently, there are a number of binders that can be used that fall within the glass temperature range of about −80 degrees Celsius to about 10 degrees Celsius.

The high Tg binder provides bond strength and adhesion of the joint compound to the substrate (e.g., wallboard and/or joint tape). It is theorized that the low Tg only mildly augments the adhesive force of the high Tg binder and that the low Tg binder's primary function is to serve as a weak inter-particle binder within the joint compound composition, so that the elasticity of the low Tg binder causes dislodged particles from the joint compound composition to aggregate during the sanding process. In contrast to the high Tg binder, the low Tg binder is sufficiently malleable at the temperatures that the joint compound is expected to be sanded (ambient conditions of 0 degrees Celsius and higher). At such temperatures, the low Tg binder is able to adhere to the smaller particles being dislodged from the joint compound during the sanding process, because of its elasticity. As a result, the low Tg binder prevents small, dust forming particles (e.g., particles less than 10 microns in size) from leaving the bulk compound and becoming airborne. As more small particles are dislodged, the low Tg binder holds onto such small particles and aggregates them together. Once the aggregated particles grow large and heavy enough, they simply fall to the ground because they are too large to float in air.

An exemplary embodiment of a low dust joint compound composition in accordance with this disclosure is directed towards a ready mix joint compound composition comprising at least calcium carbonate, water, a polyether siloxane copolymer, a high Tg binder and a low Tg binder. Generally, the concentration of calcium carbonate can be between about 25 weight percent to 95 weight percent based on the total wet weight of the compound composition (i.e., including water). It is presently preferred that the concentration of calcium carbonate be about 25 weight percent to about 60 weight percent based on the wet weight of the compound composition. Specific examples of the concentration of calcium carbonate include about 25 weight percent, about 30 weight percent, about 35 weight percent, about 40 weight percent, about 45 weight percent, about 50 weight percent, about 55 weight percent, about 60 weight percent, and ranges between any two of these values.

Generally, the concentration of water can be at least about 30 weight percent based on the wet weight of the compound composition. It is presently preferred that the concentration of water be about 30 weight percent to about 50 weight percent based on the wet weight of the compound composition. Specific examples of the concentration of water include about 30 weight percent, about 35 weight percent, about 40 weight percent, about 45 weight percent, about 50 weight percent, and ranges between any two of these values.

Generally, the concentration of polyether siloxane copolymer can be equal to or greater than about 0.01 weight percent based on the wet weight of the compound composition. It is presently preferred that the concentration of polyether siloxane copolymer be about 0.01 weight percent to about 0.50 weight percent based on the wet weight of the compound composition. Specific examples of the concentration of polyether siloxane copolymer include about 0.01 weight percent, about 0.10 weight percent, about 0.20 weight percent, about 0.30 weight percent, about 0.40 weight percent, about 0.50 weight percent, and ranges between any two of these values. While polyether siloxane copolymer is included in this embodiment as a wetting agent to improve wetting and reduce the formation of pockmarks or craters in the joint compound, it is appreciated by one skilled in the art that polyether siloxane copolymer does not need to be included in the joint compound composition.

In this ready mix embodiment, the high Tg binder comprises a functionalized styrene-butadiene polymer. Generally, the styrene-butadiene polymer is added to the joint compound composition as a powder and the concentration of styrene-butadiene polymer can be equal to or greater than about 0.5 weight percent based on the wet weight of the compound composition. It is presently preferred that the concentration of styrene-butadiene polymer be about 0.5 weight percent to about 5 weight percent based on the wet weight of the compound composition. Specific examples of the concentration of styrene-butadiene polymer include about 0.5 weight percent, about 1 weight percent, about 1.3 weight percent, about 1.5 weight percent, about 2 weight percent, about 2.5 weight percent, about 3 weight percent, about 3.5 weight percent, about 4 weight percent, about 4.5 weight percent, about 5 weight percent, and ranges between any two of these values.

In this embodiment, the low Tg binder comprises an ethylene-vinyl-acetate polymer. Generally, the ethylene-vinyl-acetate polymer is added to the joint compound as an emulsion and the concentration of the ethylene-vinyl-acetate polymer can be equal to or greater than about 0.05 weight percent based on the wet weight of the compound composition. It is presently preferred that the concentration of ethylene-vinyl-acetate polymer be about 3.00 weight percent to about 7.00 weight percent based on the wet weight of the compound composition. Specific examples of the concentration of ethylene-vinyl-acetate polymer include about 3.10 weight percent, about 3.90 weight percent, about 4.90 weight percent, about 6.95 weight percent and ranges between any two of these values.

Although not required, such a ready mix joint compound composition can further comprise various other additives, such as other fillers, thickeners, non-leveling agents, surfactants, stabilizers, preservatives, fungicides, anti-freeze agents, wetting agents, and colorings. To provide a lighter weight joint compound, glass bubbles or a treated expanded perlite can be added to the compositions as well. Examples of such lightweight ready mix joint compound compositions are now provided.

EXAMPLES

The following examples are included to demonstrate preferred embodiments of the invention. It should be appreciated by those of ordinary skill in the art that the techniques disclosed in the examples which follow represent techniques discovered by the inventors to function well and thus, can be considered to constitute preferred modes. However, those of ordinary skill in the art, in light of the present disclosure, will appreciate that many changes can be made in the specific embodiments which are disclosed and still obtain a like or similar result without departing from the scope of this disclosure.

Example 1

Lightweight, Low-Dust Joint Treatment Formulation and Measurement of Average and Peak Number of Particles The control composition shown in Table 1 was prepared by blending all components together in a mixer until a smooth composition was obtained. The weight percentages shown in Table 1 are based on the total wet weight of the compound composition.

TABLE 1

Control Ready Mix, Lightweight Joint Compound Composition for Example 1.

| Component | Weight Percent |
|---|---|
| Water | 42.3 |
| Preservatives | 0.2 |
| Limestone | 34.7 |
| Mica | 4.7 |
| Talc | 5.2 |
| Perlite | 8.1 |
| Polyether siloxane copolymer | 0.1 |
| Latex (EVA Emulsion, Elvace CPS 716) | 3.0 |
| Latex (Powder, Rhoximat PSB 150) (+5° C. Tg) | 1.2 |
| Cellulose Ether | 0.5 |

To create the low-dust joint compound formulations, the control composition described in Table 1 was modified by replacing Elvace CPS 716 with Elvace EP 1026. Three different loading levels were used for Elvace EP 1026 to create samples of the low dust joint formulation. First, Elvace CPS 716 was replaced by Elvace EP 1026 at a 1:1 load level, where an equivalent amount of Elvace EP 1026 was used to replace the Elvace CPS 716. Second, Elvace CPS 716 was replaced by Elvace EP 1026 at a 1:1.25 load level, where a 25% excess of Elvace EP 1026 was used to replace the Elvace CPS 716. Finally, Elvace CPS 716 was replaced by Elvace EP 1026 at a 1:1.50 load level, where a 50% excess of Elvace EP 1026 was used to replace the Elvace CPS 716.

To assess the reduction of dust formation during the sanding process by samples created with joint compound compositions with a low Tg binder and a high Tg binder, the samples were compared with three other commercially available products. The commercially available products are National Gypsum Company's commercially available Blue Lite product (which is the control sample set forth above), United States Gypsum Company's ("USG") Sheetrock Lightweight All Purpose Plus 3 with Dust Control commercially available low dust joint compound, and LaFarge North America, Inc.'s ("LaFarge") commercially available Rapid Coat Low Dust All Purpose Joint Compound. Testing was performed on all products upon thorough mixing.

The test procedure for measuring the quantity of airborne particles generated when sanding the hardened joint compound is largely the same as described in U.S. Pat. No. 6,358,309, which is incorporated herein by reference. In essence, a test specimen was prepared using each of the commercial products and formulations described above. The test specimens were approximately five inches long, one and one-half inches wide, and one quarter of an inch thick (5" by 1½" by ¼"). Before sanding, each test specimen was allowed to completely harden for a minimum of forty eight hours at room temperature (at least about 70 degrees Fahrenheit) in an environment where the relative humidity generally ranged from about 25% to about 75%.

A model B04552 power palm sander available from Makita Corporation of America was used to sand the specimens. The sander included a 4½×4 inch pad equipped with a 120 grit mesh sanding screen mounted over a 5×3½×¾ inch open, semi-rigid, non-woven, heavy duty, stripping, backing pad available from Minnesota Mining and Manufacturing Company. Sanding was performed at a sanding speed of approximately 14,000 orbits per minute using pressure normally applied by an ordinary person when sanding a joint compound. It will be recognized that the sanding pressure can vary depending on the hardness of the joint compound. Sanding was continued until a generally smooth wall surface was produced. Care was taken to ensure that sanding was discontinued before the drywall itself was sanded. The amount of time required to sand each specimen varied depending on the hardness of the joint compound and the sanding pressure.

Each test was performed in a test enclosure that is fully described in U.S. Pat. No. 6,358,309. Essentially, the test enclosure is a wood rectangular box six feet high, four feet wide, and two feet wide with a transparent front wall made of Plexiglas. An access opening is provided in the front wall about one foot above the bottom wall to allow the tester to insert his/her hand into the enclosure and sand the specimen. The access opening has a cover that can be closed when sanding is complete to seal the opening off.

As described in more detail in U.S. Pat. No. 6,358,309, each specimen was tested individually by clamping the specimen on a mounting block about 12 inches off of the ground within the testing enclosure. After each test, the enclosure was cleaned so that the quantity of airborne dust particles measured less than 0.5 mg/m$^3$. A DUSTTRAK™ aerosol monitor (model 8520, commercially available from TSI Incorporated) was used to measure the quantity of airborne dust particles from when sanding started until the level of airborne particles decreased to less than 50% of its peak level. The DUST-TRAK™ aerosol monitor measures the number of particles having a size of less than or equal to 10 microns and was positioned about 48 inches above the samples.

As shown in Table 2, the peak or highest level of airborne particles measured during the test is presented, as well as, the average number of particles measured for the duration of the test. Three different specimens were prepared and tested for each of the sample formulations.

TABLE 2

Comparison of Average and Maximum Level of Airborne Particles

| Desc. of Sample | Sample ID No. | Average (mg/m$^3$) | Maximum (mg/m$^3$) | Elapsed Time (min.) |
|---|---|---|---|---|
| Control | 2936-41-1 | 61.30 | 91.90 | 3:10 |
| Blue Lite | 2936-41-1 | 83.10 | 132.00 | 2:11 |
|  | 2936-41-1 | 87.60 | 134.00 | 2:38 |
|  | Average | 77.33 | 119.30 |  |
| Low Tg (1:1) | 2936-41-2 | 33.10 | 57.00 | 1:18 |
|  | 2936-41-2 | 31.00 | 56.20 | 1:55 |
|  | 2936-41-2 | 24.70 | 40.60 | 1:41 |
|  | Average | 29.60 | 51.27 |  |
| Low Tg (1:1.25) | 2936-41-3 | 21.50 | 41.10 | 1:31 |
|  | 2936-41-3 | 20.40 | 33.50 | 2:03 |
|  | 2936-41-3 | 20.00 | 34.30 | 1:54 |
|  | Average | 20.63 | 36.30 |  |
| Low Tg (1:1.50) | 2936-41-4 | 12.80 | 25.50 | 1:04 |
|  | 2936-41-4 | 13.20 | 22.00 | 0:58 |
|  | 2936-41-4 | 13.40 | 24.80 | 1:50 |
|  | Average | 13.13 | 24.10 |  |
| USG Low Dust | 2936-41-5 | 15.30 | 28.40 | 2:00 |
|  | 2936-41-5 | 11.70 | 22.90 | 2:11 |
|  | 2936-41-5 | 25.30 | 39.60 | 2:29 |
|  | Average | 17.43 | 30.30 |  |
| LaFarge Low Dust | 2936-41-6 | 55.10 | 78.90 | 2:13 |
|  | 2936-41-6 | 62.20 | 95.30 | 1:22 |
|  | 2936-41-6 | 89.60 | 134.00 | 2:05 |
|  | Average | 68.97 | 102.73 |  |

As demonstrated by the above results, all of the joint compound formulations comprising a low Tg binder with a high Tg binder produced less airborne dust than the control specimens and the LaFarge low dust joint compound specimens. The performance of these formulations against the USG low dust joint compound depended on the level of low Tg polymer in the formulation. The low dust formulation with a low Tg binder load level of 1:1.5 produced better results than the USG low dust joint compound specimens. Moreover, it has been noticed that the USG low dust joint compound composition causes an increase in the frequency of clogging of the sand paper during sanding. The low Tg/high Tg binder joint compound compositions of Example 1 do not lead to such an increase in clogging. Such low Tg/high Tg binder joint compound compositions also do not cause an increase in flashing problems.

Example 2

Lightweight, Low-Dust Joint Treatment Formulation and TWA Test

In another example, a joint compound composition was prepared by blending all the components shown in Table 3 together in a mixer until a smooth composition was obtained. The weight percentages shown in Table 3 are based on the total wet weight of the compound composition.

TABLE 3

Joint Compound Composition for TWA Test

| Component | Weight Percent |
|---|---|
| Water | 41.71 |
| Limestone | 34.12 |
| Latex Elvace 1028 (EVA Emulsion) (−40° C. Tg) | 2.75 |
| Rhoximat PSB 150 (Powder) (+5° C. Tg) | 1.38 |
| Cellulose Ether | .50 |
| Perlite | 7.76 |
| Preservations | .24 |
| Polyether siloxane copolymer | .05 |
| Clay | 1.67 |
| Mica | 4.69 |
| Talc | 5.14 |

Airborne dust from sanding joint compound compositions falls under OSHA standards for exposure to nuisance dust. OSHA recommends that the exposure level for nuisance dust be no more than a time-weighted-average quantity of 15 mg/m$^3$ over an 8 hour period. In view of OSHA's recommendation, samples were prepared using the joint compound set forth in Table 3 and subjected to a test to determine the time it took for its time-weighted-average ("TWA") to fall below the 15 mg/m$^3$ level. Largely, the same testing method was used as described in association with Example 1 to determine how long the time-weighted-average of each of the samples took to fall below the 15 mg/m$^3$. While the same sanding technique and test enclosure were used, the DUSTRAK™ aerosol monitor was replaced with Thermo Electron Corporation's commercially available MIE DataRAM 4 (for Datalogging Real-time Aersol Monitor 4), model DR-4000. The DR-4000 instrument was placed about forty-eight inches above where the sample was sanded and the air was sucked into the DR-4000 instrument at a rate of 1 liter per minute with a dust reading being recorded every three seconds.

Samples prepared with the joint compound composition of Example 2 were compared to samples prepared with USG's Sheetrock Lightweight All Purpose Plus 3 with Dust Control commercially available low dust joint compound, and LaFarge's commercially available Rapid Coat Low Dust All Purpose Joint Compound. As shown in Table 4, the peak or maximum level of airborne particles (Maximum (mg/m$^3$)), the duration, in minutes and second, in which the dust level reading exceeded the 15 mg/m$^3$ level (Time), and the duration, in minutes and seconds, the time-weighted-average of the dust level exceeded 15 mg/m$^3$ (TWA Time) were all measured.

TABLE 4

Comparison of TWA Time

| Sample ID No. | Product | Maximum (mg/m$^3$) | TWA Time |
|---|---|---|---|
| 42-1 | LaFarge Low Dust | 48.51 | 56 min 21 sec |
| 42-3-1 | USG Low Dust | 53.92 | 40 min 57 sec |
| 42-3-2 |  | 32.57 | 3 min 15 sec |
| 46-5-1 | Example 2 | 15.95 | 0 |
| 46-5-2 |  | 56 | 12 min 48 sec |
| 46-5-3 |  | 34.38 | 2 min 32 sec |

In comparing the samples with similar peak levels of airborne particles, the Example 2 sample 46-5-2 with a peak level of 56 mg/m3, as compared to the USG sample 42-3-1 with a peak value of 53.92 mg/m$^3$ and LaFarge sample 42-1, has a lower amount of time where the time-weighted average of airborne dust particles exceeded 15 mg/m$^3$. Similarly, the Example 2 sample 46-5-3 with a peak level of 34.38 mg/m$^3$, as compared to the USG sample 42-3-2 with a peak value of 32.57 mg/m$^3$, has a lower amount of time where the time-weighted average of airborne dust particles exceeded 15 mg/m$^3$. Thus, the low Tg/high Tg binder joint compound compositions of Example 2 produced better results than the USG and LaFarge samples. Moreover, similar to Example 1 and in contrast to the USG samples, the low Tg/high Tg binder joint compound compositions of Example 2 do not lead to an increase in clogging of sand paper. Such low Tg/high Tg binder joint compound compositions also do not cause an increase in flashing problems.

All of the compositions and/or methods disclosed and claimed herein can be made and executed without undue experimentation in light of the present disclosure. While the compositions disclosed herein have been described in terms of embodiments, preferred embodiments and examples, it will be apparent to those of ordinary skill in the art that variations and modifications may be made to the compositions herein without departing from the concept and scope of the invention. More specifically, it will be apparent that certain agents which are chemically related may be substituted for the agents described herein while the same or similar results would be achieved. All such similar substitutes, variations and modifications apparent to those skilled in the art are deemed to be within the scope and concept of this disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. Such sequences may be varied and still remain within the scope of the present disclosure.

We claim:

1. A joint compound composition capable of reducing the amount of dust produced during sanding of the joint compound composition, said joint compound composition comprising:
    a filler material selected from the group consisting of calcium carbonate, calcium sulfate dihydrate, talc, and calcium sulfate hemihydrate; and
    at least a first binder and a second binder, wherein the first binder comprises a styrene-butadiene polymer and has a glass transition temperature that is equal to or greater than about −10 degrees Celsius, the second binder comprises an ethylene vinyl acetate polymer and has a glass transition temperature in the range of about −80 degrees Celsius to about 10 degrees Celsius, and the glass transition temperature of the first binder is at least about 5 degrees Celsius greater than the glass transition temperature of the second binder.

2. The joint compound composition of claim 1 wherein the first binder has a glass transition temperature in the range of about 0 degrees Celsius to about 40 degrees Celsius.

3. The joint compound composition of claim 1 wherein the filler material comprises between about 25% to about 95% of the total wet weight of the joint compound composition.

4. The joint compound composition of claim 1 wherein the second binder comprises an emulsion comprising water, an ethylene vinyl acetate latex polymer, and a plasticizer capable of depressing the glass transition temperature of the latex polymer.

5. The joint compound composition of claim 1 wherein the first binder comprises at least about 0.5% of the total wet weight of the joint compound composition and the second binder comprises at least about 0.05% of the total wet weight of the joint compound composition.

6. A method for producing a joint compound composition capable of reducing the amount of dust produced during sanding of the joint compound composition, the method comprising the steps of:
    providing at least one filler material selected from the group consisting of calcium carbonate, calcium sulfate dihydrate, talc, and calcium sulfate hemihydrate;
    adding a first binder comprising a styrene-butadiene polymer and that has a glass transition temperature that is equal to or greater than about −10 degrees Celsius to the at least one filler material; and
    adding a second binder comprising an ethylene vinyl acetate polymer and that has a glass transition temperature in the range of about −80 degrees Celsius to about 10 degrees Celsius to the at least one filler material, wherein the glass transition temperature of the first binder is at least 5 degrees Celsius greater than the second binder.

7. The method of claim 6 further comprising the step of mixing the filler, first polymer binder and second polymer binder.

8. The method of claim 6 further comprising the steps of: mixing the filler and second polymer binder; and adding the first polymer binder after mixing the filler and second polymer binder.

9. The method of claim 6 further comprising the steps of: mixing the filler and first polymer binder; and adding the second polymer binder after mixing the filler and first polymer binder.

10. The method of claim 6 wherein the second binder comprises an emulsion comprising water, an ethylene vinyl acetate latex polymer, and a plasticizer capable of depressing the glass transition temperature of the latex polymer.

11. A joint compound composition, comprising:
    a filler selected from the group consisting of: calcium carbonate, calcium sulfate dihydrate, talc, and calcium sulfate hemihydrate;
    a first binder comprising a styrene-butadiene polymer and having a glass transition temperature that is equal to or greater than about −10° C., and comprising between about 0.5 wt % to about 5 wt % of the composition; and
    a second binder comprising an ethylene vinyl acetate polymer and having a glass transition temperature in the range of about −80° C. to about 10° C., and comprising between about 3.0 wt % to about 7.0 wt % of the composition;
    wherein the glass transition temperature of the first polymeric binder is at least about 5° C. greater than the glass transition temperature of the second polymeric binder.

12. The joint compound composition of claim 11, wherein the first polymeric binder comprises between about 1.0 wt % to about 1.3 wt % of the composition, and the second polymeric binder comprises between about 3.9 wt % to about 4.9 wt % of the composition.

13. The joint compound of claim 11, wherein the second polymeric binder is a latex that further comprises a plasticizer.

* * * * *